(12) United States Patent
Riviere et al.

(10) Patent No.: US 8,133,424 B2
(45) Date of Patent: Mar. 13, 2012

(54) STRUCTURAL ELEMENT FOR A MOTOR VEHICLE, AND A METHOD OF FABRICATING SUCH AN ELEMENT

(75) Inventors: Caroline Riviere, Valentigney (FR); Claude Laurent, Voujeaucourt (FR); Sebastien Berne, Luze (FR)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 12/770,235

(22) Filed: Apr. 29, 2010

(65) Prior Publication Data
US 2010/0207296 A1 Aug. 19, 2010

Related U.S. Application Data

(62) Division of application No. 11/790,154, filed on Apr. 24, 2007.

(30) Foreign Application Priority Data

Apr. 25, 2006 (FR) ..................................... 06 03682

(51) Int. Cl.
*B29C 45/14* (2006.01)
(52) U.S. Cl. ................. 264/271.1; 264/251; 264/171.14
(58) Field of Classification Search .................. 264/521, 264/171.14, 271.1
See application file for complete search history.

(56) References Cited

U.S. PATENT DOCUMENTS

| 5,041,253 | A | * | 8/1991 | Husted | ........................ 264/251 |
|---|---|---|---|---|---|
| 5,658,041 | A | | 8/1997 | Girardot et al. | |
| 6,273,496 | B1 | | 8/2001 | Guyomard et al. | |
| 2003/0077409 | A1 | | 4/2003 | Schnell | |
| 2004/0160088 | A1 | * | 8/2004 | Staargaard et al. | ...... 296/193.09 |

FOREIGN PATENT DOCUMENTS

| DE | 100 14 332 | 10/2001 |
|---|---|---|
| EP | 0679565 | 11/1995 |
| EP | 1380493 | 1/2004 |
| EP | 1032527 | 4/2004 |
| EP | 1500488 | 1/2005 |
| WO | 2004/056610 | 7/2004 |

* cited by examiner

*Primary Examiner* — Christina Johnson
*Assistant Examiner* — Galen Hauth
(74) *Attorney, Agent, or Firm* — Young & Thompson

(57) ABSTRACT

This element (2) is of the type including a hollow elongate body (4) made of metal and having a closed section; and a continuous second body (6) made of plastics material overmolded on the metal first body (4), the plastics material second body (6) including at least two rings (24) surrounding the metal first body (4), the rings (24) being longitudinally spaced part. In any cross-section of the metal first body (4), the plastics material second body (6) is situated entirely outside the outline of the metal first body (4), and the ratio of the axial length of each ring (24) over the longitudinal distance between the rings (24) is less than 1. The invention is applicable to the front faces of motor vehicles.

8 Claims, 3 Drawing Sheets

STRUCTURAL ELEMENT FOR A MOTOR VEHICLE, AND A METHOD OF FABRICATING SUCH AN ELEMENT

This application is a divisional application of application Ser. No. 11/790,154 filed Apr. 24, 2007, which claims the priority of French Application No. 06 03682 filed Apr. 25, 2006. The entire contents of each of the above-identified applications are hereby incorporated by reference.

The present invention relates to a structural element for a motor vehicle, the element being of the type comprising:

a hollow elongate first body made of metal and having a closed cross-section: and a continuous second body made of plastics material overmolded on the metal first body, the plastics material second body including at least two rings surrounding the metal first body, the rings being longitudinally spaced apart.

WO 2004/056610 describes a structural element for a motor vehicle, the element comprising a metal tube and a body of plastics material overmolded on the tube. The plastics material body is connected to the tube firstly by buttons of plastics material situated inside the tube and formed through openings in the tube, and secondly by portions surrounding the tube.

Nevertheless, the connection of the plastics material body to the tube requires both first openings to allow the buttons to pass to the inside of the tube, and secondly second openings situated facing the first openings to enable moving portions of the mold to be inserted into the tube so as to form the buttons inside the tube.

Those first and second openings reduce the overall strength of the structural element. In addition, fabrication requires a mold that is made complicated by the fact that it includes moving parts.

An object of the invention is to propose a structural element of improved strength and that is easy to fabricate.

To this end, the invention provides a structural element of the above-specified type, characterized in that, in any cross-section of the metal first body, the plastics material second body is situated entirely outside the outline of the metal first body, and the ratio of the axial length of each ring over the longitudinal distance between the rings, is less than 1.

In other embodiments, the structural element includes one or more of the following characteristics, taken in isolation or in any technically feasible combination:

each ring is overmolded on the metal first body on a portion thereof that is of circular cross-section;

the metal first body possesses a cross-section that is non-circular outside a segment of the metal first body on which the rings are overmolded; and the ratio of the axial length of each ring over the longitudinal distance between the rings is less than 0.6.

The invention also provides a motor vehicle including a structural element as defined above.

The invention also provides a method of fabricating a structural element comprising a hollow elongate first body made of metal and of closed cross-section, and a continuous second body of plastics material overmolded on the metal first body, in which the plastics material second body is connected to the metal first body by overmolding at least two longitudinally spaced-apart rings of the plastics material second body onto the metal first body, each ring surrounding the metal first body, the method being characterized in that, in any crosssection of the metal first body, the plastics material second body is situated entirely outside the outline of the metal first body, and the ratio of the axial length of each ring over the longitudinal distance between the rings is less than 1.

In other implementations, the method includes one or more of the following characteristics, taken in isolation or in any technically feasible combination:

each ring is overmolded on the metal first body on a portion thereof that is of circular cross-section;

each ring is overmolded at a longitudinal distance from an edge of a molding chamber such that the ratio of the length of a ring at said edge over the distance of said ring from said edge is greater than 0.3;

the ratio of the length of a ring over the longitudinal distance between said ring and an adjacent edge of the molding chamber is greater than 0.4; and the ratio of the axial length of each ring over the longitudinal distance between the rings is less than 0.6.

The invention and its advantages can be better understood on studying the following description, given purely by way of example, and made with reference to the accompanying drawings, in which.

Below, directions are specified in the usual manner for a motor vehicle.

Figure 2:
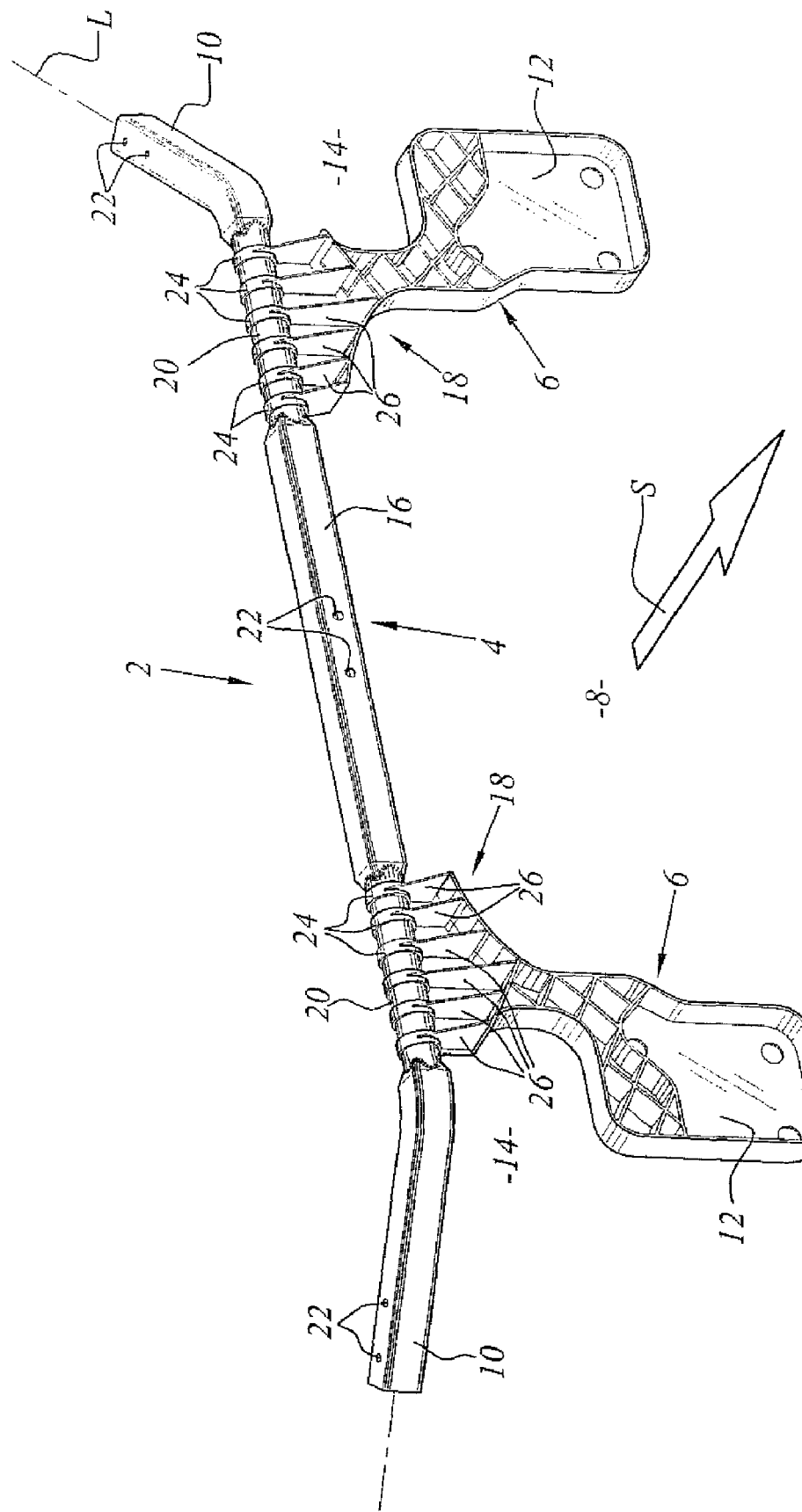

Thus, terms such as "front", "rear", "lateral", "right", "left", "horizontal", "vertical", "top", and "bottom" should be understood relative to the position of a driver and relative to the travel direction of a vehicle moving forwards, as represented by an arrow S in FIG. 2.

Figure 1:
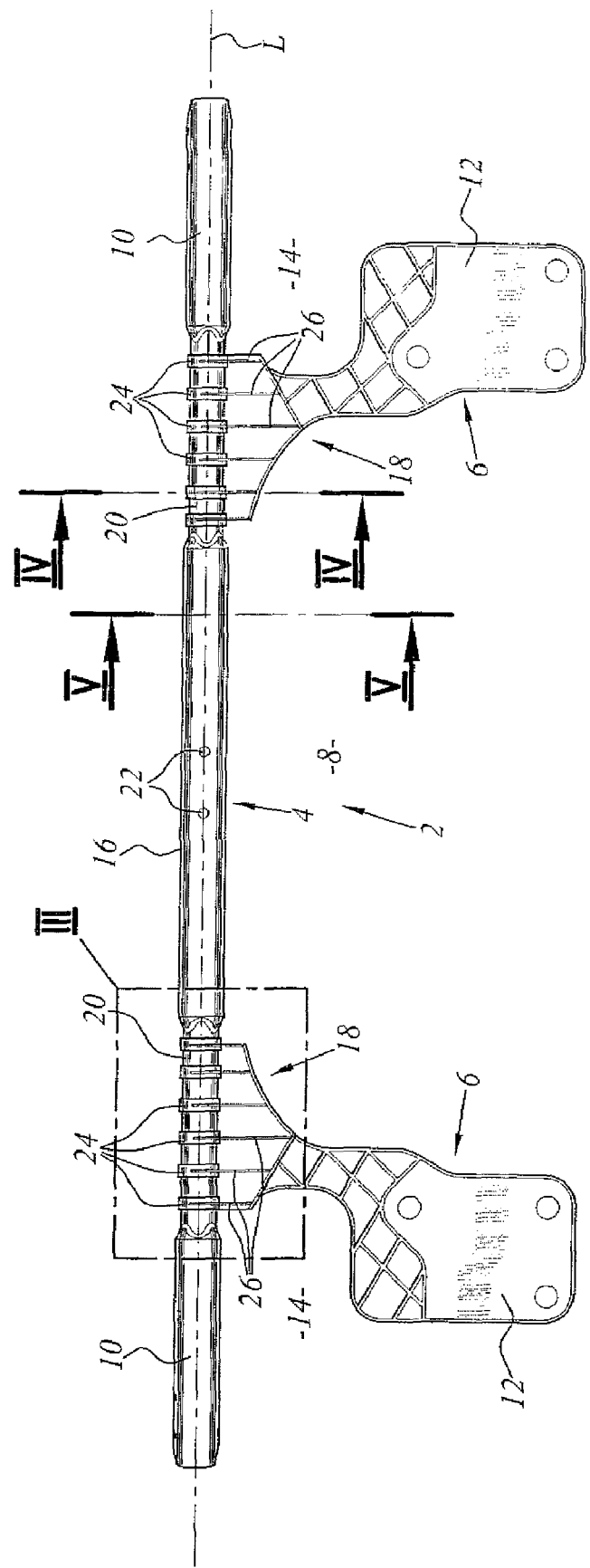
FIGS. 1 and 2 are respectively a face view and a perspective view of a structural element in accordance with the invention.
Figure 3:
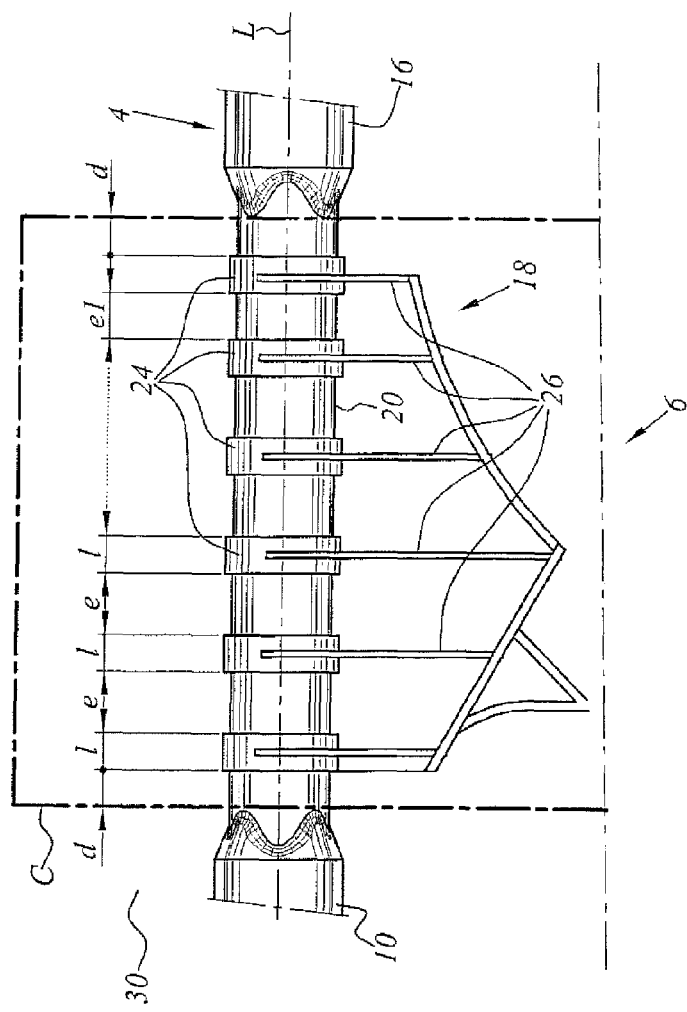
FIG. 3 is a fragmentary view on a larger scale of a zone III in FIG. 1.

With reference to FIGS. 1 to 3, the structural element 2 comprises a tubular metal top cross-member 4 that extends substantially horizontally along a longitudinal line L of the cross-member 4, together with two side uprights 6 made of plastics material and that extend substantially vertically.

The two uprights 6 are spaced apart laterally from each other, and they extend downwards from the cross-member 4.

Such a structural element 2 constitutes a front face for a motor vehicle, and it is designed to be mounted at the front of a motor vehicle to support various pieces of equipment such as headlight units, an electric fan unit, a radiator, condenser, . . . .

Thus, the uprights 6 define between them a central space 8 for receiving a radiator, a condenser, and an electric fan unit, for example.

Similarly, the end portions 10 of the cross-member 4 cooperate with support plates 12 of the uprights 6 that extend laterally outwards to define spaces 14 for receiving headlight units.

The cross-member 4 has a central upright 16 extending laterally, with end portions 10 that slope rearwards relative to the central portion 16. Thus, the line L is curved. In a variant, the line L is straight.

At its top end, each upright 6 has a connection portion 18 connecting the upright 6 with a corresponding segment 20 of the cross-member 4 that is situated longitudinally between one of the end portions 10 and the central portion 16. The segments 20 are spaced apart laterally.

Each portion 18 includes a group of rings 24, in this case six rings, that are spaced apart along the line L, each ring 24 surrounding the corresponding segment 20, and also includes plates 26, each plate 26 extending vertically downwards from a corresponding ring 24 to connect said ring to the remainder of the upright 6.

Each upright 6 is continuous. Thus, each upright 6 is a single piece, and its various portions are integrally molded with one another. In particular, the rings 24 of each upright 6 are integrally molded with one another.

The cross-member 4 presents a cross-section of closed outline. The cross-member 4 thus possesses a high level of mechanical strength.

Figure 4:
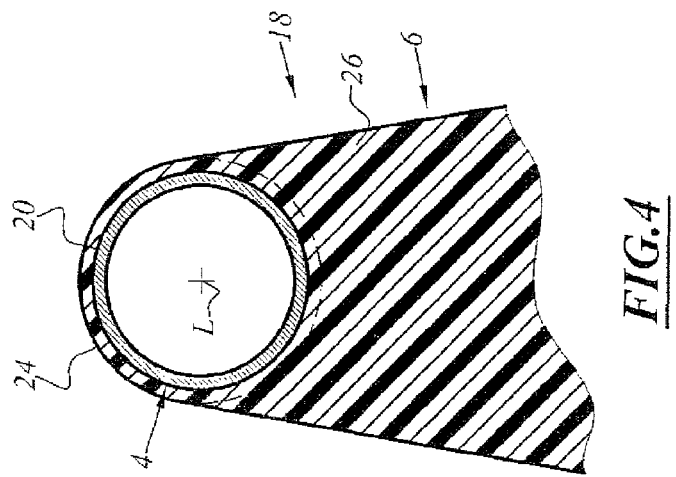
FIGS. 4 and 5 are section views on IV-IV and V-V of the FIG. 1 structural element.
Figure 5:
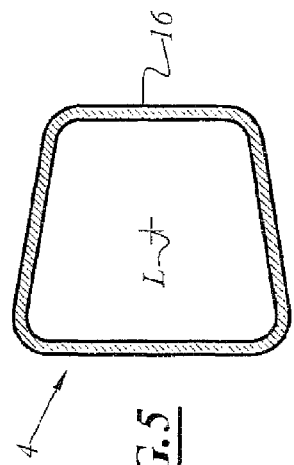

As shown in FIGS. 4 and 5, the cross-member 4 in each of its segments 20 possesses a cross-section that is circular (FIG. 4), whereas outside the segments 20, its cross-section is non-circular (FIG. 5), in this example it is trapezoidal. The cross-section is non-circular in the end portions 10 and in the central portion 16.

Each segment 20 possesses a cross-section that is constant. In a variant, a segment 20 may have overmolding segments of circular cross-section that are separated by intermediate segments of some other section, e.g. a non-circular section, with each ring being overmolded on a corresponding overmolding segment.

As shown in FIG. 4, each ring 24, and more generally each upright 6 lies in the cross-section of the corresponding segment 20 outside the outline of that segment 20.

Each upright 6 is thus overmolded onto the outside of the corresponding segment 20 without an opening being formed between the inside and the outside through the segment 20.

Overall, the cross-member 4 does not have any openings, and in particular it does not have any openings in the segment 20. The cross-member 4 might possibly be provided with holes 22 for fastening accessories to the cross-member, but these holes 22 are of small size, and they are located outside the segments 20.

If the cross-member 4 is made of aluminum, for example, then it has a thickness lying in the range 2 millimeters (mm) to 4 mm, or if it is made of steel, then it has thickness lying in the range 1 mm to 2.5 mm.

As can be seen more clearly in FIG. 3 that shows the portion 18 for the right upright 6 (i.e. on the left in FIGS. 1 and 2), the rings 24 of an upright 6 possess a length l in the longitudinal direction, that is identical for all of the rings, in this example.

Each ring 24 is spaced apart from the or each adjacent ring 24 by a certain longitudinal distance e or e1.

In a method of fabricating the element 2, in a first step of forming the cross-member 4, the cross-member 4 is made from a cylindrical tube of section that is substantially circular and identical to that of the segment 20 by placing the tube in a hydroforming mold, and by deforming the tube radially outwards by applying uniform pressure inside the tube so as to give it, outside the segment 20, a section that is different, depending on the stiffness desired for the cross-member 4.

In a second step of forming an upright 6, as shown in FIG. 3, the cross-member 4 is placed in a molding chamber having edges 30 close to the portion 18 of the upright 6 that are represented diagrammatically by chain-dotted lines C, and the plastics material is injected under pressure into the chamber in order to form the one-piece upright 6.

The edges 30 define the sealing boundary between the inside and the outside of the molding chamber.

Each portion 18 includes lateral rings 24 having the other rings 24 of the portion 18 situated between them. Each lateral ring 24 is spaced longitudinally apart from the nearer edge 30 by a longitudinal distance d.

It is possible to form the uprights 6 simultaneously in a mold having one chamber for each upright 6, or else to do so in two successive steps.

While the uprights 6 are being overmolded, there is a risk of the cross-member 4 collapsing under the effect of the high pressure applied by the plastics material against the outside surface of the cross-member 4, which is itself hollow.

According to an aspect of the invention, the ratio R of the length l of each ring 24 of an upright 6 over the distance e or e1 between that ring 24 and the or each adjacent ring 24 of the upright 6 is less than 1. With a steel cross-member the ratio R is preferably less than 0.6.

According to another aspect of the invention, the ratio F of the length l of each lateral ring 24 over the longitudinal distance d to the nearer edge 30 is greater than 0.3, and preferably greater than 0.4, in particular when using steel.

Complying with the ratios R and/or F serves to limit the risk of collapse, while nevertheless ensuring that the cross-member 4 is sufficiently covered in the plastics material to ensure a satisfactory connection between each upright 6 and the cross-member 4.

The ratio R is preferably greater than 0.2 in order to ensure a satisfactory connection between each upright 6 and the cross-member 4.

The cohesion obtained between the plastics material and the cross-member 4 serves to avoid each ring 24 turning relative to the corresponding segment 20 about the line L.

Connecting each upright 6 to the cross-member 4 solely by means of rings 24 surrounding the outside of the cross-member 4 avoids the need to form openings, in particular in the segments 20, thereby conserving the strength of the cross-member 4. The rings 24 are overmolded in simple manner without any mold portions needing to be inserted inside the cross-member 4.

By overmolding the rings 24 on segments 20 of circular section, it is possible to ensure that pressure forces are distributed uniformly in a radial direction during overmolding, thereby further reducing any risk of collapse, and making fabrication easier.

In the example shown, the edges 30 are situated at the longitudinal ends of the segment 20, close to the transition between the circular section (segment 20) and the section that is non-circular (trapezoidal). The edges 30 are situated in register with a circular section. Thus, only the segment 20 of circular section that is very strong against external pressure is inserted in the molding chamber.

Thus, by means of the invention, a "hybrid" structural element is obtained, i.e. an element made both of metal and of plastics material overmolded on the metal, that can be obtained easily and that presents satisfactory strength.

The invention applies to the front faces and more generally to any structural element of motor vehicles.

The invention claimed is:

1. A method of fabricating a structural element (2) comprising a hollow elongate first body (4) made of metal and of closed cross-section, and a continuous second body (6) of plastics material overmolded on the metal first body (4), the second body (6) being an upright;

in which the plastics material second body (6) is connected to the metal first body (4) by overmolding at least two longitudinally spaced-apart rings (24) of the plastics material second body (6) onto the metal first body, each ring (24) surrounding the metal first body (4), wherein, in any cross-section of the metal first body (4), the plastics material second body (6) is situated entirely outside the outline of the metal first body (4), and the ratio of the axial length (l) of each ring (24) over the longitudinal distance between the rings (e, e1) is less than 1, and wherein said structural element (2) fabricated is a structural member for an automotive vehicle front face comprising a metal cross-member and two plastic uprights.

2. A method according to claim 1, wherein each ring (24) is overmolded on the metal first body (4) on a portion (20) thereof that is of circular cross-section.

3. A method according to claim 2, wherein each ring (24) is overmolded at a longitudinal distance (d) from an edge (30) of a molding chamber such that the ratio (F) of the length (l) of a ring (24) at said edge (30) over the distance of said ring from said edge (30) is greater than 0.3.

4. A method according to claim 3, wherein the ratio (F) of the length (l) of a ring (24) over the longitudinal distance (d) between said ring (24) and an adjacent edge (30) of the molding chamber is greater than 0.4.

5. A method according to claim 1, wherein the ratio (R) of the axial length (l) of each ring (24) over the longitudinal distance (e or e1) between the rings (24) is less than 0.6.

6. A method according claim 2, wherein the ratio (R) of the axial length (l) of each ring (24) over the longitudinal distance (e or e1) between the rings (24) is less than 0.6.

7. A method according to claim 3, wherein the ratio (R) of the axial length (l) of each ring (24) over the longitudinal distance (e or e1) between the rings (24) is less than 0.6.

8. A method according to claim 1, wherein, said structural element (2) comprises the tubular metal top cross-member and the two plastic side uprights extending substantially vertically from said tubular metal top cross-member, the two uprights spaced apart laterally from each other and defining therebetween a central space for receiving one of a radiator, a condenser, and an electric fan unit.

\* \* \* \* \*